Dec. 18, 1934.  A. A. MACKERT  1,984,887
ANGLE COCK DEVICE
Filed March 12, 1932
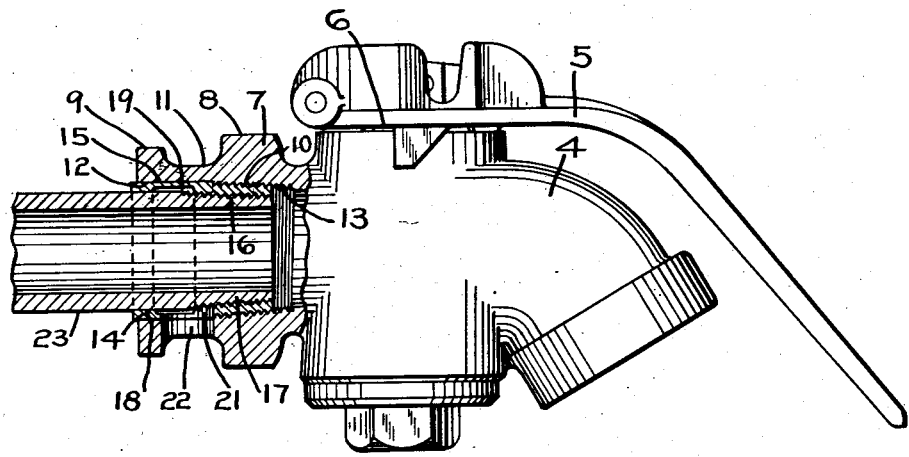
INVENTOR.
ALBERT A. MACKERT
By *Wm. H. Cady*
ATTORNEY.

Patented Dec. 18, 1934

1,984,887

UNITED STATES PATENT OFFICE 1,984,887

ANGLE COCK DEVICE

Albert A. Mackert, Wilmerding, Pa., assignor to The Westinghouse Air Brake Company, Wilmerding, Pa., a corporation of Pennsylvania Application March 12, 1932, Serial No. 598,321

3 Claims. (Cl. 285—13)

This invention relates to angle cocks used in fluid pressure brake systems and particularly to the fittings appurtenant thereto for attaching them to a car and for connecting them to the brake pipe.

Angle cocks commonly in use are provided with threaded bores for receiving the threaded end of a brake pipe in the manner of the usual pipe fitting, and consequently the threads of the pipe and angle cock body are subjected to lateral or transverse stresses which tend to loosen the joint and cause leakage. Where this type of fitting is employed, the brake pipe is usually fastened to the car adjacent to the angle cock which is supported by the pipe, and stresses imposed by the attached flexible hose connections and the operation of the angle cock valve further tend to loosen the angle cock.

Because of these objectionable features the improved angle cocks recently placed in service have been provided with a sleeve-like extension having a threaded bore for receiving the threaded end of a brake pipe, and with an unthreaded cylindrical portion which snugly engages the unthreaded exterior surface of the brake pipe at a point remote from the threaded portion of the pipe, and which supports the pipe and relieves the threaded joints from transverse or lateral stresses.

The extension is provided with a hexagonal wrench receiving flange portion and an external annular groove which constitutes a seat for a U-bolt, which serves to fasten the angle cock to a car with a flat surface of the hexagonal portion in engagement with a flat plate provided on the car. Thus the angle cock is rigidly secured to the car and cannot turn relative to the brake pipe or transmit lateral stresses thereto tending to loosen it.

It is often necessary to remove the angle cocks for repair, and removal frequently so damages the threads of the angle cock that leakage would occur if replaced upon the brake pipe. This renders the angle cock useless for further service even though the valve portion thereof may be successfully repaired.

An object of this invention is to provide a bushing for the improved type angle cock that may be fitted into the rebored and tapped bore thereof when such angle cocks are being repaired or reclaimed, and which is provided with an internal unthreaded cylindrical portion for engaging the unthreaded portion of the brake pipe at a point remote from the threaded portion thereof for the purpose above described, and wherein the bushing is substantially entirely disposed within the bore of the angle cock body and becomes a permanent part thereof.

A further object of this invention is to provide a simple and inexpensive bushing construction that may be conveniently forced into permanent assembly with the angle cock at the time the latter is being screwed upon the brake pipe.

These and other objects that will be made apparent throughout the further description of the invention are attained by means of the angle cock device hereinafter described and illustrated in the accompanying drawing; wherein The figure is an elevational view, partially in section, of an angle cock device embodying features of the invention.

Referring to the drawing the angle cock device comprises a metal body 4 in which a valve of the plug type is mounted that is actuated by an operating handle 5 that is attached to the stem 6 of the valve. The valve plug forms no part of this invention and therefore will not be specifically described.

The body 4 is provided with an extension 7 having the usual hexagonal wrench receiving flange 8 and with an annular flange 9 at the extreme end of the extension that is spaced from the hexagonal flange 8 by an annular groove 11 that constitutes a seat for receiving a U-bolt, not shown, by means of which the angle cock is fastened to the car in the well known manner.

The angle cock herein illustrated is one that has been removed from service and is one in which the standard pipe thread has become so damaged that leakage would occur if the valve is replaced upon the brake pipe. The angle cock body has, therefore, been rebored to a diameter larger than that of the brake pipe and the new bore comprises a cylindrical portion 12 and a taper pipe threaded portion 13, that is adapted to receive the reclaiming bushing 14 which comprises a metal sleeve having an external cylindrical portion 15 that snugly fits the cylindrical bore 12, and a taper threaded portion 10 that fits the threaded bore 13 of the angle cock body as indicated in the figure. Since the outer unthreaded portion of the bushing snugly fits the cylindrical portion 12 of the bore, the threaded portion of the bushing is relieved from any lateral stresses that may be imposed by the brake pipe 23 which is threaded into the bore of the bushing 14.

The bushing 14 is provided internally with tapered pipe thread 16 for receiving the taper threaded end of the brake pipe 23, and the outer end of the bushing is provided with an unthreaded cylindrical bore 18 that is spaced from the threaded portion of the bushing by an internal annular recess 19, which is aligned with a relief opening 21 in the bushing that registers with the relief opening 22 in the angle cock body extension 7. The purpose of the relief opening is to drain any liquid that might escape from the brake pipe past the threaded portion of the joint.

In assembling the bushing and angle cock device upon a brake pipe, the bushing is first placed upon the threaded portion of the pipe and is then started into the threaded portion of the angle cock device. The angle cock device is then turned by a wrench applied to the hexagonal flange 8, and as the angle cock is turned with respect to the brake pipe 23, the bushing is screwed into the angle cock body as the bushing is screwed upon the threaded end of the brake pipe. In this manner the bushing is forced into the bore of the angle cock body and constitutes a parmanent part thereof. The brake pipe is supported at a point remote from the threaded end of the pipe and consequently the threaded joint is relieved of lateral or transverse stresses as in the case of an angle cock body before the bore thereof was rebored to receive the bushing.

While I have disclosed but one embodiment of the invention, it is obvious that many changes, omissions and additions may be made in the construction without departing from the spirit of the invention.

Having now described my invention, what I claim as new and desire to secure by Letters Patent, is:

1. The combination with an angle cock body and a brake pipe, of an internally and externally threaded bushing fitting into a threaded bore in said body, the said bushing having an unthreaded portion supported in said bore adjacent its outer end for relieving the threaded portion from lateral stresses and having an internal unthreaded cylindrical portion spaced from the internally threaded portion of the bushing by an annular relief recess and for snugly engaging and supporting the brake pipe at a point remote from its threads for relieving the threaded portion of the brake pipe from lateral stresses.

2. The combination with an angle cock body and a brake pipe, of an internally and externally threaded bushing fitting into a threaded bore in said body, the said bushing having an unthreaded portion supported in said bore adjacent its outer end for relieving the threaded portion from lateral stresses and having an internally unthreaded cylindrical portion adjacent its outer end for snugly engaging and supporting the brake pipe at a point remote from its threads for relieving the threaded portion of the brake pipe from lateral stresses.

3. The combination with an angle cock body and a brake pipe, of an internally and externally threaded bushing fitting within a partially threaded bore in the said body and having a threaded portion engaging the threaded portion of the bore and a cylindrical portion snugly fitting the unthreaded portion of the bore at a point remote from the threads of the bushing, the said bushing having an internal unthreaded cylindrical portion for snugly engaging and supporting the brake pipe at a point remote from its threads for relieving the threaded portion of the brake pipe from lateral stresses.

ALBERT A. MACKERT.